US009494191B2

(12) United States Patent
Okamoto et al.

(10) Patent No.: US 9,494,191 B2
(45) Date of Patent: Nov. 15, 2016

(54) GROMMET

(71) Applicants: NIFCO INC., Yokosuka-shi (Kanagawa) (JP); TOYOTA BOSHOKU KABUSHIKI KAISHA, Kariya-shi (Aichi) (JP)

(72) Inventors: Daisuke Okamoto, Yokosuka (JP); Hirofumi Hori, Yokosuka (JP); Masato Arashi, Kariya (JP); Naoya Okada, Toyota (JP)

(73) Assignees: NIFCO INC., Yokosuka-shi (Kanagawa) (JP); TOYOTA BOSHOKU KABUSHIKI KAISHA, Kariya-shi (Aichi) (JP)

( * ) Notice: Subject to any disclaimer, the term of this patent is extended or adjusted under 35 U.S.C. 154(b) by 0 days.

(21) Appl. No.: 14/961,012

(22) Filed: Dec. 7, 2015

(65) Prior Publication Data

US 2016/0169279 A1 Jun. 16, 2016

(30) Foreign Application Priority Data

Dec. 10, 2014 (JP) ................................ 2014-250382

(51) Int. Cl.
H02G 3/22 (2006.01)
F16L 5/00 (2006.01)
F16C 29/02 (2006.01)

(52) U.S. Cl.
CPC .................................... F16C 29/02 (2013.01)

(58) Field of Classification Search
CPC . Y10T 16/05; Y10T 16/063; B60R 16/0222; B60R 16/0207; B60R 16/0215; H02G 3/22; H02G 3/0468; H02G 3/0481; H02G 15/013; F16L 5/10; F16B 5/0258; F16B 43/001; H01R 13/5205; H01R 13/5208
See application file for complete search history.

(56) References Cited

U.S. PATENT DOCUMENTS

| | | | | |
|---|---|---|---|---|
| 4,522,378 A | * | 6/1985 | Nelson | F16B 5/0258 16/2.1 |
| 4,685,173 A | * | 8/1987 | Pavur | B60R 16/0222 16/2.2 |
| 5,526,549 A | * | 6/1996 | Mori | F16L 5/02 16/2.1 |

(Continued)

FOREIGN PATENT DOCUMENTS

| | | | | |
|---|---|---|---|---|
| JP | EP 1125797 A2 | * | 8/2001 | ......... B60R 16/0222 |
| JP | 2001258134 A | * | 9/2001 | |

(Continued)

*Primary Examiner* — Chuck Mah
(74) *Attorney, Agent, or Firm* — Thomas | Horstemeyer, LLP (57) ABSTRACT

When an attachment circular-cylinder section coupled to one axial line direction end portion of a mainbody circular-cylinder section of a grommet is inserted into an opening portion in an upper frame, engagement claws formed at an outer periphery of the attachment circular-cylinder section engage with a peripheral edge portion of the opening portion by elastically deforming, enabling the grommet to be attached to the upper frame. When a seatback spring is passed through the grommet, a retaining section formed at an inner peripheral portion of a boundary between the mainbody circular-cylinder section and the attachment circular-cylinder section retains the seatback spring. An internal-diameter of the retaining section is smaller than internal-diameters of the mainbody circular-cylinder section and the attachment circular-cylinder section, and both inner peripheral faces of the mainbody circular-cylinder section and the attachment circular-cylinder section have cone shape with a decreasing diameter on progression toward the retaining section.

10 Claims, 7 Drawing Sheets

(56) References Cited

U.S. PATENT DOCUMENTS

| | | | |
|---|---|---|---|
| 6,240,597 B1 * | 6/2001 | Mochizuki | B60R 16/0222 16/2.1 |
| 6,297,457 B1 * | 10/2001 | Yamada | B60R 16/0222 16/2.1 |
| 6,442,794 B2 * | 9/2002 | Uchida | B60R 16/0222 16/2.1 |
| 6,525,269 B2 * | 2/2003 | Sato | B60R 16/0222 16/2.1 |
| 6,708,366 B2 * | 3/2004 | Ono | B60R 16/0222 16/2.1 |
| 6,967,285 B2 * | 11/2005 | Sanroma | B60R 16/0222 16/2.1 |
| 2003/0014924 A1 * | 1/2003 | Nakamura | B60R 16/0222 52/1 |
| 2004/0154819 A1 * | 8/2004 | Sakata | B60R 16/0222 174/650 |

FOREIGN PATENT DOCUMENTS

| | | | |
|---|---|---|---|
| JP | 2001327049 A | * | 11/2001 |
| JP | 2002017026 A | * | 1/2002 |
| JP | 4339054 | | 10/2009 |

* cited by examiner

GROMMET

CROSS-REFERENCE TO RELATED APPLICATION

This application claims priority under 35 USC 119 from Japanese Patent Application No. 2014-250382 filed Dec. 10, 2014, the disclosure of which is incorporated by reference herein.

BACKGROUND

Field of the Invention

The present invention is related to a grommet for retaining a line-shaped member such as a wire at an attached-to member such as a plate, avoiding interference therebetween.

Related Art

For example, a grommet described in Japanese Patent No. 4339054 is a known grommet of this type. In this grommet, a circular cylinder section that is attached at an opening portion of an attached-to member, and a retaining section that retains a line-shaped member, are provided projecting manner at a grommet main body. The circular cylinder section and the retaining section are formed continuously to each other via a rib formed along an end face of a slit formed from the retaining section directed in a radial direction. Claw portions that engage with the opening portion of the attached-to member are formed at an outer periphery of the circular cylinder section, and protrusion portions are formed with a specific separation on each side of the claw portion.

However, in the grommet described in Japanese Patent No. 4339054, the retaining section cannot retain the line-shaped member if the line-shaped member is at an angle with respect to an axial line direction of the grommet in a case in which a hard line-shaped member such as a metal wire is retained by the retaining section.

SUMMARY

In consideration of the above circumstances, a grommet is obtained that is capable of retaining a line-shaped member even if the line-shaped member is at an angle with respect to the axial line direction of the grommet.

A grommet of a first aspect includes: a main body circular cylinder section through which a line-shaped member is capable of being passed; an attachment circular cylinder section that is coupled to one end portion, in an axial line direction, of the main body circular cylinder section, and that is capable of being inserted into an opening portion formed at an attached-to member; an engagement portion that is formed at an outer peripheral portion of the attachment circular cylinder section, and that is capable of engaging with a peripheral edge portion of the opening portion by elastically deforming; and a retaining section that is formed at an inner peripheral portion of a boundary between the main body circular cylinder section and the attachment circular cylinder section, that is capable of retaining the line-shaped member, and that has a smaller internal diameter than an internal diameter of the main body circular cylinder section and an internal diameter of the attachment circular cylinder section; wherein at least one of an inner peripheral face of the main body circular cylinder section or an inner peripheral face of the attachment circular cylinder section has a cone shape with a decreasing diameter on progression toward the retaining section.

In the grommet of the first aspect, when the attachment circular cylinder section coupled to the one end portion in the axial line direction of the main body circular cylinder section is inserted into the opening portion provided at the attached-to member, the engagement portion formed at the outer periphery of the attachment circular cylinder section engages with the peripheral edge portion of the opening portion by elastically deforming, thereby enabling attachment of the grommet to the attached-to member. Moreover, when the line-shaped member is passed through the grommet, the retaining section that is formed at the inner peripheral portion of the boundary between the main body circular cylinder section and the attachment circular cylinder section retains the line-shaped member. The internal diameter of the retaining section is smaller than the internal diameter of the main body circular cylinder section and the internal diameter of the attachment circular cylinder section, and at least one of the inner peripheral face of the main body circular cylinder section or the inner peripheral face of the attachment circular cylinder section has a cone shape with the decreasing diameter on progression toward the retaining section. The line-shaped member can be easily inserted into the grommet from the main body circular cylinder section or the attachment circular cylinder section having the inner peripheral face with a cone shape, and the line-shaped member can be retained by the retaining section of the grommet even in a case in which the line-shaped member is at an angle with respect to the axial line direction of the grommet.

A second aspect is the grommet of the first aspect, wherein both the inner peripheral face of the main body circular cylinder section and the inner peripheral face of the attachment circular cylinder section have a cone shape with the decreasing diameter on progression toward the retaining section.

In the grommet of the second aspect, both the inner peripheral face of the main body circular cylinder section and the inner peripheral face of the attachment circular cylinder section have a cone shape. Accordingly, the line-shaped member can be even more easily inserted, and the line-shaped member can be more stably retained.

A third aspect of the invention is the grommet of either the first aspect or the second aspect, further including a plurality of protrusion portions that are formed projecting out from the retaining section at intervals therebetween in a peripheral direction of the retaining section, and that extend along the axial line direction.

In the grommet of the third aspect of the invention, the plural protrusion portions are formed projecting out from the retaining section, are disposed with intervals therebetween in the peripheral direction, and extend along the axial line direction. The protrusion portions accordingly abut the line-shaped member, thereby enabling a reduction in sliding resistance between the retaining section and the line-shaped member, and the line-shaped member passes through the grommet more easily. Moreover, the protrusion portions enable rattling of the line-shaped member to be suppressed, and adjustment against rattling of the line-shaped member can be performed by modifying height of the protrusion portions, thereby facilitating adjustment and setting.

A fourth aspect is the grommet of any one of the first aspect to the third aspect, wherein a length of the main body circular cylinder section in the axial line direction is longer than a length of the attachment circular cylinder section in the axial line direction.

In the grommet of the fourth aspect, the length of the main body circular cylinder section in the axial line direction is longer than the length of the attachment circular cylinder section in the axial line direction. The main body circular cylinder section is therefore easy to grasp, giving good assembly workability when passing the attachment circular cylinder section of the grommet through the opening formed at the attached-to member. Moreover, when confirming, after mounting, that the grommet does not come off by being pulled out, the main body circular cylinder section is easy to grasp, giving good workability.

A fifth aspect of the invention is the grommet of any one of the first aspect to the fourth aspect, further including a contact portion that is formed at the outer peripheral portion of the attachment circular cylinder section, and that contacts an inner peripheral wall of the opening portion.

In the grommet of the fifth aspect of the invention, the contact portion that abuts the inner peripheral wall of the opening portion formed at the attached-to member is formed at the outer periphery of the attachment circular cylinder section. This thereby enables rattling of the grommet against the attached-to member to be prevented by the contact portion abutting the inner peripheral wall of the opening portion formed at the attached-to member in an attached state of the attachment circular cylinder section of the grommet to the opening portion formed at the attached-to member.

Due to the above configuration, the grommet of the first aspect is capable of retaining the line-shaped member even when the line-shaped member is at an angle with respect to the axial line direction of the grommet.

Due to the above configuration, the grommet of the second aspect enables even easier insertion of the line-shaped member, and is capable of retaining the line-shaped member more stably.

Due to the above configuration, the grommet of the third aspect enables the line-shaped member to be easily passed through. The protrusion portions enable rattling of the line-shaped member to be suppressed, and adjustment and setting against rattling of the line-shaped member are easily performed.

Due to the above configuration, the grommet of the fourth aspect improves a mounting workability to the opening portion formed at the attached-to member, and workability of confirming assembly thereof.

Due to the above configuration, the grommet of the fifth aspect of the present invention enables rattling against the attached-to member to be prevented.

BRIEF DESCRIPTION OF THE DRAWINGS

Exemplary Embodiment will be described in detail with reference to the following figures, wherein.

DETAILED DESCRIPTION

Explanation follows regarding a grommet according to an exemplary embodiment, with reference to FIG. 1 to FIG. 7. In FIG. 1 to FIG. 7, the arrow UP indicates the upward direction of a vehicle seat (seat) to which the grommet is mounted, and IN indicates the width direction inside of the vehicle seat.

Figure 7:
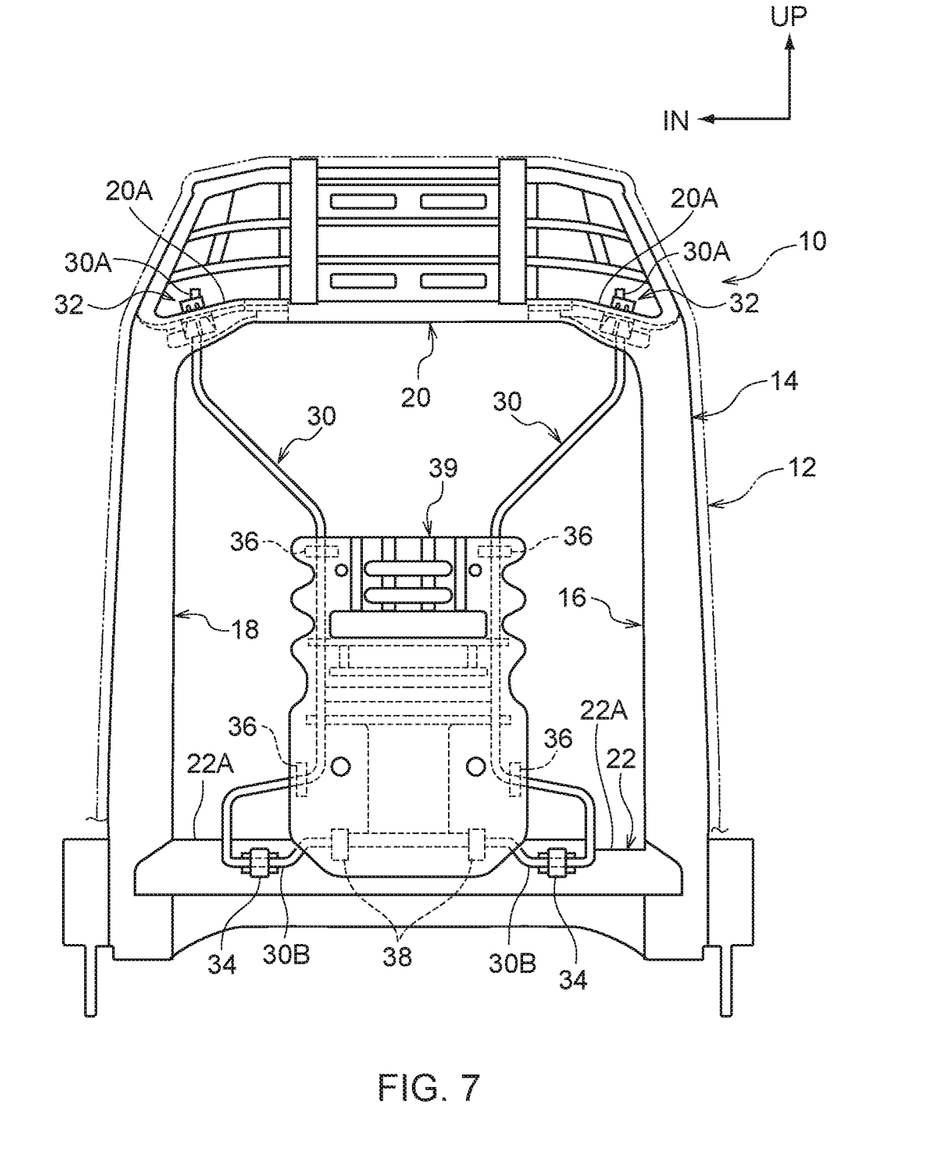
FIG. 7 is a schematic view illustrating a seatback frame applied with a grommet according to an exemplary embodiment, as viewed from the vehicle front.

As illustrated in FIG. 7, a vehicle seat 10 of the present exemplary embodiment is provided with a seat cushion (not illustrated in the drawings) on which an occupant sits, and a seatback 12 that supports a back portion of the occupant sitting in the vehicle seat 10.

A seatback frame 14 configuring frame of the seatback 12 is provided at an inner portion of the seatback 12. The seatback frame 14 includes left and right side frames 16 and 18, an upper frame 20 spanning between upper ends of the left and right side frames 16 and 18, and a lower frame 22 spanning between lower ends of the left and right side frames 16 and 18.

A seatback spring 30 that is configured from metal wire or the like and serve as a hard line-shaped member is provided spanning among both end portions 20A of the upper frame 20 and both end portions 22A of the lower frame 22. Upper end portions 30A of the seatback springs 30 are attached to both end portions 20A via grommets 32 of the present exemplary embodiment.

Lower portions 30B of the seatback springs 30 are attached to both end portions 22A of the lower frame 22 via respective clips 34. A seatback panel 39 is fixed to the seatback springs 30 via clips 36 and 38.

Grommet Configuration

Figure 1:
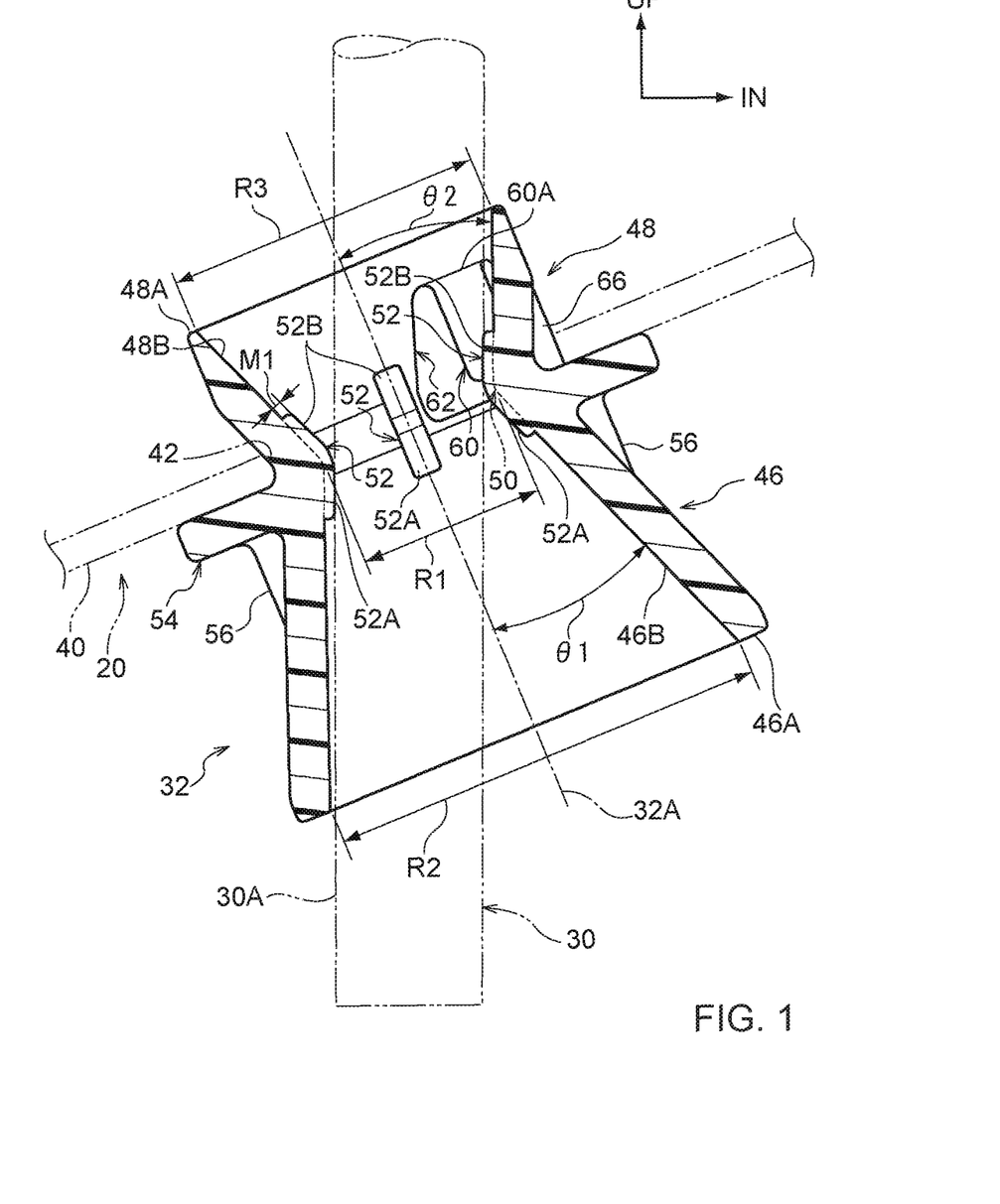
FIG. 1 is a cross-section illustrating a grommet according to an exemplary embodiment, taken along the 1-1 cross section line in FIG. 5.

As illustrated in FIG. 1, the grommets 32 of the present exemplary embodiment are capable of attaching to circular shaped opening portions 42 (for example, through holes) formed (drilled or punched) at an attachment portion 40 of the upper frame 20, serving as an attached-to member. Note that the attachment portion 40 of the upper frame 20 is configured by an inclined face inclined from the upper side of the seat width direction inside toward the lower side of the seat width direction outside.

Figure 2:
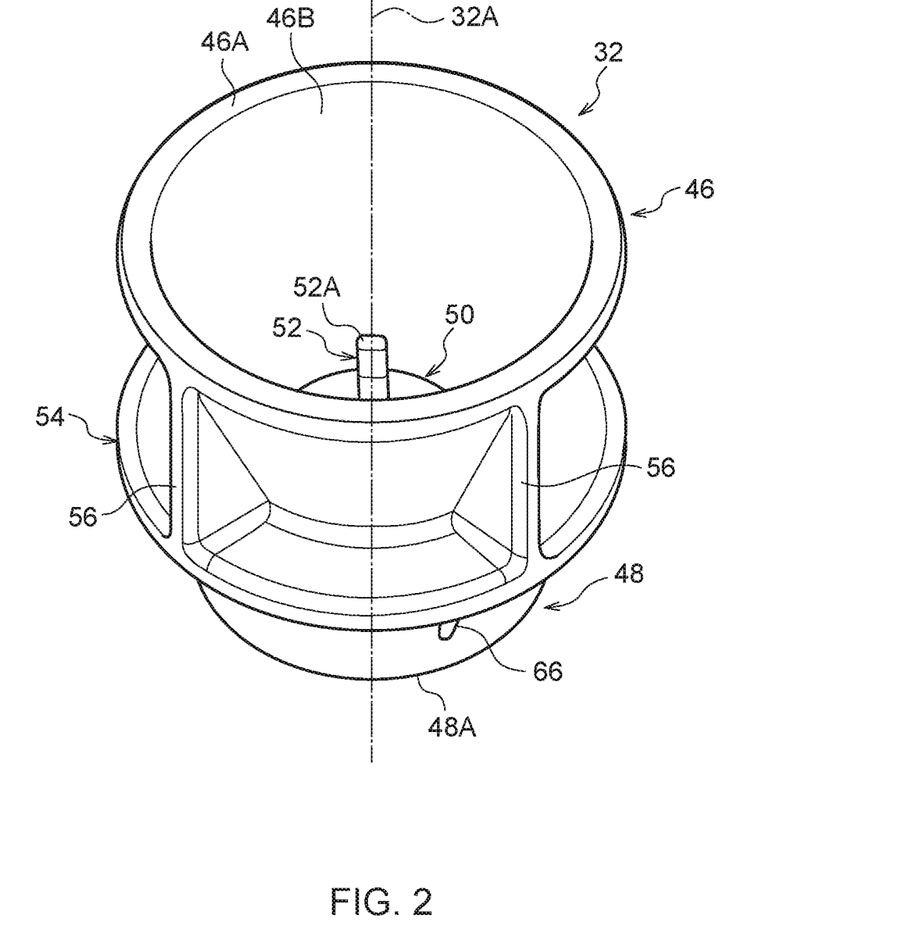
FIG. 2 is a perspective view illustrating a grommet according to an exemplary embodiment, as viewed in one direction along an axial line direction.
Figure 3:
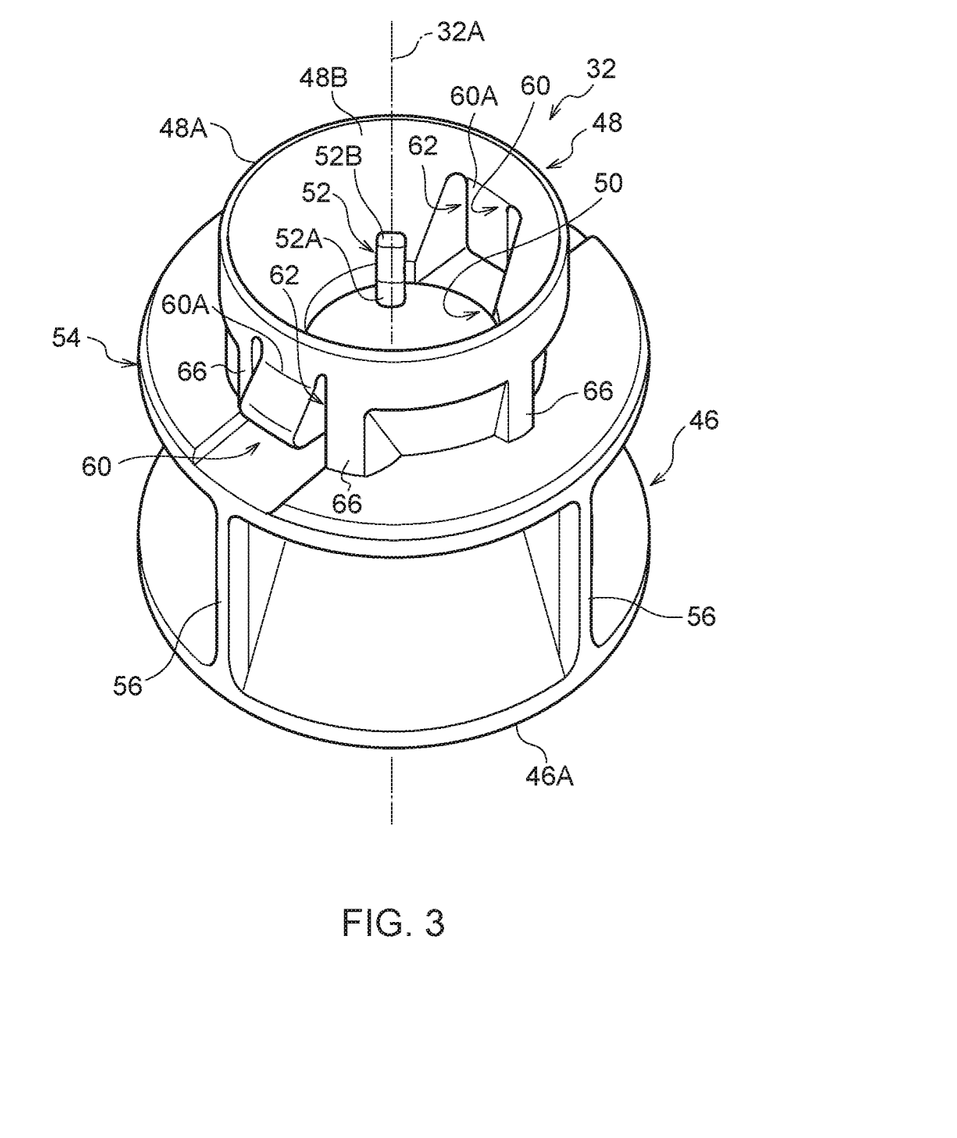
FIG. 3 is a perspective view illustrating a grommet according to an exemplary embodiment, as viewed in another direction along the axial line direction.

As illustrated in FIG. 2 and FIG. 3, each of the grommets 32 is formed in a cylinder tube shape with a circular cross-section as viewed along the direction of an axial line 32A of the grommet 32. The seatback spring 30, serving as a line-shaped member (see FIG. 1), can be passed through the inside of the cylinder portion of the grommet 32. The grommet 32 is configured by a main body circular cylinder section 46 at one side along the direction of the axial line 32A, and an attachment circular cylinder section 48 coupled to one end portion of the main body circular cylinder section 46 at another side along the direction of the axial line 32A.

As illustrated in FIG. 1, a retaining section 50 is formed at an inner peripheral portion of a boundary between the main body circular cylinder section 46 and the attachment circular cylinder section 48 of the grommet 32. An internal diameter R1 of the retaining section 50 is smaller than an internal diameter R2 of the main body circular cylinder section 46 and an internal diameter R3 of the attachment circular cylinder section 48 (R1<R2, R3). Note that the internal diameter of an end portion 46A of the main body circular cylinder section 46, which is on the opposite side to the attachment circular cylinder section 48, is larger than the internal diameter of an end portion 48A of the attachment circular cylinder section 48, which is on the opposite side to the main body circular cylinder section 46.

In the present exemplary embodiment, both an inner peripheral face 46B of the main body circular cylinder section 46 and an inner peripheral face 48B of the attachment circular cylinder section 48 have cone shapes with a decreasing diameter on progression toward the retaining section 50. Note that an opening angle θ1 between the inner peripheral face 46B of the main body circular cylinder section 46 and the axial line 32A of the grommet 32, and an opening angle θ2 between the inner peripheral face 48B of the attachment circular cylinder section 48 and the axial line 32A of the grommet 32 are equal to each other.

Figure 5:
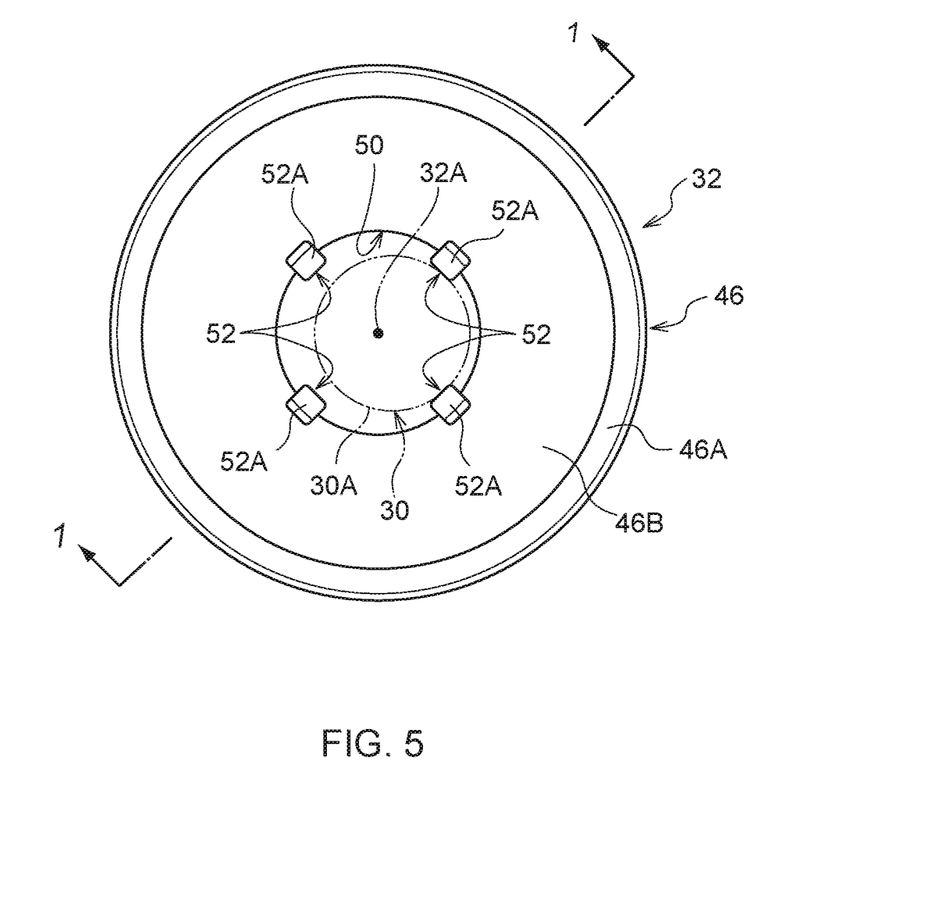
FIG. 5 is a plan view illustrating a grommet according to an exemplary embodiment, as viewed in the one direction along the axial line direction.
Figure 6:
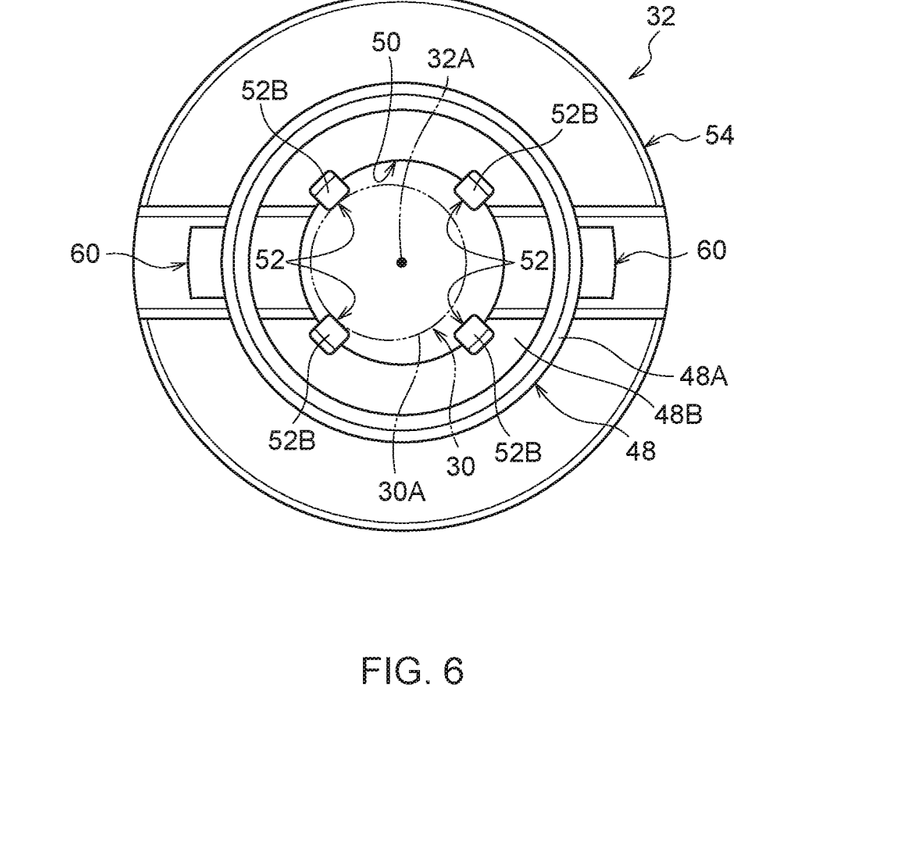
FIG. 6 is a plan view illustrating a grommet according to an exemplary embodiment, as viewed in the another direction along the axial line direction.

As illustrated in FIG. 5 and FIG. 6, plural protrusion portions 52 are formed projecting out from the retaining section 50. The protrusion portions 52 are formed at four locations at uniform intervals therebetween along the peripheral direction of the grommet 32. The protrusion portions 52 are configured in rectangular shapes as viewed along the direction of the axial line 32A of the grommet 32.

As illustrated in FIG. 1, the protrusion portions 52 extend along the directions toward the axial line 32A of the grommet 32. One end portion 52A of each of the protrusion portions 52 reaches the inner peripheral face 46B of the main body circular cylinder section 46, and another end portion 52B of each of the protrusion portions 52 reaches the inner peripheral face 48B of the attachment circular cylinder section 48. Note that the protrusion portion 52 has a uniform projection amount (thickness) M1 along the length direction (axial line 32A direction).

Accordingly, as illustrated in FIG. 5 and FIG. 6, the protrusion portions 52 abut the seatback spring 30, thereby enabling a reduction in sliding resistance between the retaining section 50 and the seatback spring 30.

As illustrated in FIG. 3, the outer periphery of a coupling portion between the attachment circular cylinder section 48 and the main body circular cylinder section 46 is formed with a flange portion 54 that projects out toward the radial direction outside in a ring shape.

Figure 4:
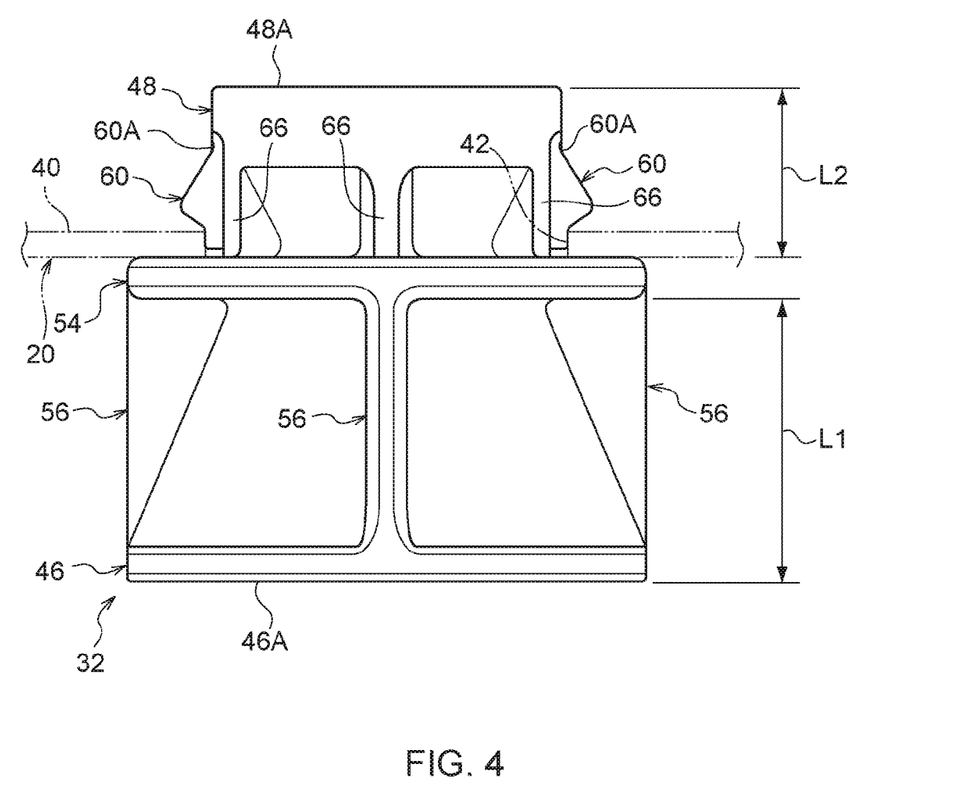
FIG. 4 is a side view illustrating a grommet according to an exemplary embodiment.

As illustrated in FIG. 4, a length L1 of the main body circular cylinder section 46 from the flange portion 54 along the direction of the axial line 32A of the grommet 32 is longer than a length L2 of the attachment circular cylinder section 48 from the flange portion 54 along the direction of the axial line 32A of the grommet 32 (L1>L2). It is accordingly easy for an operative to grasp the main body circular cylinder section 46 when inserting the grommet 32 into the opening portion 42 formed at the attachment portion 40 of the upper frame 20. It is also easy for the operative to grasp the main body circular cylinder section 46 when confirming, after mounting, that the grommet does not come off by being pulled out.

As illustrated in FIG. 2 and FIG. 3, ribs 56 are formed between the flange portion 54 and the main body circular cylinder section 46. The ribs 56 are formed at four locations at uniform intervals therebetween along the peripheral direction of the grommet 32, and are formed at positions offset by 45° along the peripheral direction with respect to the respective protrusion portions 52. As illustrated in FIG. 4, viewed along a direction around the peripheral direction of the grommet 32, the shape of the rib 56 is configured as a shape of triangular reaching: the end portion 46A of the main body circular cylinder section 46 which is on the opposite side to the attachment circular cylinder section 48; and an outer periphery of the flange portion 54.

As illustrated in FIG. 3, engagement claws 60, serving as engagement portion, are formed at the outer periphery of the attachment circular cylinder section 48. The engagement claws 60 are formed at two locations at uniform intervals therebetween along the peripheral direction of the grommet 32, and are formed at the same peripheral direction positions as the ribs 56. A cutaway 62 is continuously formed on both peripheral direction sides and on the flange portion 54 side of each of the engagement claws 60, and each of the engagement claws 60 is capable of elastic deformation toward the radial direction outside and the radial direction inside of the attachment circular cylinder section 48 due to a hinge portion 60A of the engagement claw 60, which is formed on the opposite side to the flange portion 54.

As illustrated in FIG. 4, as viewed along a direction in the peripheral direction of the grommet 32, the respective engagement claws 60 are configured in a mountain-like shape, and are capable of engaging with the peripheral edge portion of the circular opening portion 42 formed at the attachment portion 40 of the upper frame 20 by undergoing elastic deformation.

Accordingly, when the attachment circular cylinder section 48 is inserted into the circular opening portion 42 formed at the attachment portion 40 of the upper frame 20, the engagement claws 60 slide against the opening portion 42 and elastically deform toward the radial direction inside of the attachment circular cylinder section 48, thereafter the engagement claws 60 recover toward the radial direction outside. The peripheral edge portion of the circular opening portion 42 formed at the attachment portion 40 of the upper frame 20 is thereby held (gripped or nipped) between the engagement claws 60 and the flange portion 54.

As illustrated in FIG. 3, plural abut portions 66 are formed at locations on the flange portion 54 side of an outer peripheral portion of the attachment circular cylinder section 48. The abut portions 66 are formed at locations adjacent to the respective engagement claws 60 on both peripheral direction sides, and at positions separated from the engagement claws 60 by 90° around the peripheral direction.

As illustrated in FIG. 1, when the attachment circular cylinder section 48 is inserted into the circular opening portion 42 formed at the attachment portion 40 of the upper frame 20, and the grommet 32 is attached to the upper frame 20, the plural abut portions 66 abut the inner peripheral wall of the opening portion 42. This thereby enables rattling of the grommet 32 against the upper frame 20 to be prevented.

Operation and Advantageous Effects

Next, explanation follows regarding operation of the present exemplary embodiment.

As illustrated in FIG. 4, in the grommet 32 of the present exemplary embodiment, the attachment circular cylinder section 48 is inserted into the circular opening portion 42 formed at the attachment portion 40 of the upper frame 20. The engagement claws 60 formed at the outer periphery of the attachment circular cylinder section 48 thereby engage with the peripheral edge portion of the opening portion 42 by elastic deformation, enabling attachment of the grommet 32 to the attachment portion 40 of the upper frame 20.

As illustrated in FIG. 1, when the upper end portion 30A of the seatback spring 30 is passed through the grommet 32, the retaining section 50 formed at the inner peripheral portion of the boundary between the main body circular cylinder section 46 and the attachment circular cylinder section 48 retains the upper end portion 30A of the seatback spring 30. The internal diameter R1 of the retaining section 50 is smaller than the internal diameter R2 of the main body circular cylinder section 46 and the internal diameter R3 of the attachment circular cylinder section 48, and both the inner peripheral face 46B of the main body circular cylinder section 46 and the inner peripheral face 48B of the attachment circular cylinder section 48 have cone shapes with a decreasing diameter on progression toward the retaining section 50.

Accordingly, in the grommet 32 of the present exemplary embodiment, the seatback spring 30 can be easily inserted into the grommet 32 from the main body circular cylinder section 46 or the attachment circular cylinder section 48, that have respective cone shapes. Moreover, as illustrated in FIG. 1, the upper end portion 30A of the seatback spring 30 can be retained by the retaining section 50 of the grommet 32 even when the axial line 32A of the grommet 32 is at an angle (is inclined) with respect to the upper end portion 30A of the seatback spring 30.

Note that the upper end portion 30A of the seatback spring 30 can be retained by the retaining section 50 of the grommet 32 even when the axial line 32A of the grommet 32 is not at an angle (is not inclined) with respect to the upper end portion 30A of the seatback spring 30.

In the grommet 32 of the present exemplary embodiment, four of the protrusion portions 52 are formed projecting out at the retaining section 50, and each of the protrusion portions 52 extends along the direction of the axial line 32A of the grommet 32. Accordingly, as illustrated in FIG. 5 and FIG. 6, sliding resistance between the retaining section 50 and the seatback spring 30 can be reduced due to the protrusion portions 52 abutting the seatback spring 30. The seatback spring 30 passes through the grommet 32 more easily as a result. Moreover, the protrusion portions 52 enable rattling of the seatback spring 30 to be suppressed, and rattling of the seatback spring 30 can be adjusted (corrected) by modifying the height of the protrusion portions 52, thereby facilitating adjustment and setting.

In the grommet 32 of the present exemplary embodiment, as illustrated in FIG. 4, the length L1 of the main body circular cylinder section 46 along the direction of the axial line 32A of the grommet 32 is longer than the length L2 of the attachment circular cylinder section 48 along the direction of the axial line 32A of the grommet 32 (L1>L2). The main body circular cylinder section 46 is therefore easy to grasp, giving good workability when an operative passes the grommet 32 through the opening portion 42 formed at the attachment portion 40 of the upper frame 20. Moreover, when the operative confirms that the grommet 32 does not come off by being pulled out after mounting the grommet 32, the main body circular cylinder section 46 is easy to grasp, again giving good workability.

In the grommet 32 of the present exemplary embodiment, as illustrated in FIG. 1, when the attachment circular cylinder section 48 is inserted into and attached to the circular opening portion 42 formed at the attachment portion 40 of the upper frame 20, the plural abut portions 66 abut the inner peripheral wall of the opening portion 42. This thereby enables the grommet 32 to be prevented from rattling against the upper frame 20.

Other Exemplary Embodiments

Detailed explanation has been given above of a specific exemplary embodiment; however the present invention is not limited to the above exemplary embodiment, and it would be clear to a person skilled in the art that various other exemplary embodiments are possible within the scope of the present invention. For example, in the above exemplary embodiment, both the inner peripheral face 46B of the main body circular cylinder section 46 and the inner peripheral face 48B of the attachment circular cylinder section 48 of the grommet 32 have cone shapes with a decreasing diameter on progression toward the retaining section 50. Alternatively, configuration may be made in which only one of the inner peripheral face 46B of the main body circular cylinder section 46 or the inner peripheral face 48B of the attachment circular cylinder section 48 has a cone shape with a decreasing diameter on progression toward the retaining section 50, and the other of the inner peripheral face 46B of the main body circular cylinder section 46 or the inner peripheral face 48B of the attachment circular cylinder section 48 may have a circular cylinder shape with a larger internal diameter than the internal diameter of the retaining section 50.

In a case in which one of the inner peripheral face 46B of the main body circular cylinder section 46 or the inner peripheral face 48B of the attachment circular cylinder section 48 has a decreasing diameter on progression toward the retaining section 50, the upper end portion 30A of the seatback spring 30 can be retained by the retaining section 50 of the grommet 32 even when the axial line 32A of the grommet 32 is at an angle with respect to the upper end portion 30A of the seatback spring 30, better than in a case in which neither the inner peripheral face 46B of the main body circular cylinder section 46 nor the inner peripheral face 48B of the attachment circular cylinder section 48 has a decreasing diameter.

In the above exemplary embodiment, the opening angle θ1 between the inner peripheral face 46B of the main body circular cylinder section 46 and the axial line 32A of the grommet 32 and the opening angle θ2 between the inner peripheral face 48B of the attachment circular cylinder section 48 and the axial line 32A of the grommet 32 are equal to each other. Alternatively, the opening angle θ1 between the inner peripheral face 46B of the main body circular cylinder section 46 and the axial line 32A of the grommet 32 may be a different angle to the opening angle θ2 between the inner peripheral face 48B of the attachment circular cylinder section 48 and the axial line 32A of the grommet 32.

In the above exemplary embodiment, the grommet 32 is applied to attachment of the seatback spring 30, serving as a line-shaped member, to the upper frame 20, serving as an attached-to member. However, the line-shaped member is not limited to the seatback spring 30, and configuration may be made with other line-shaped member such as a wire. Moreover, the attached-to member is not limited to the upper frame 20, and configuration may be made with other attached-to members, such as the lower frame 22, or the like.

In the above exemplary embodiment, four of the protrusion portions 52 are formed projecting out at the retaining section 50 of the grommet 32. However, the retaining section 50 may have a different number of the protrusion portions 52, such as three or five, or configuration may be made in which the protrusion portions 52 are not provided.

In the above exemplary embodiment, the length L1 of the main body circular cylinder section 46 from the flange portion 54 along the direction of the axial line 32A of the grommet 32 is longer than the length L2 of the attachment circular cylinder section 48 from the flange portion 54 along the direction of the axial line 32A of the grommet 32 (L1>L2). Alternatively, the length L1 of the main body circular cylinder section 46 may be the same as the length L2 of the attachment circular cylinder section 48 (L1=L2). Moreover, the length L1 of the main body circular cylinder section 46 may be shorter than the length L2 of the attachment circular cylinder section 48 (L1<L2).

In the above exemplary embodiment, plural of the abut portions 66 are formed at the outer peripheral portion of the attachment circular cylinder section 48 of the grommet 32. However, configuration may be made in which the abut portions 66 are not provided. The grommet of the present invention may be applied to locations other than a vehicle seat.

What is claimed is:

1. A grommet comprising:
    a main body circular cylinder section through which a line-shaped member is capable of being passed;
    an attachment circular cylinder section that is coupled to one end portion, in an axial line direction, of the main body circular cylinder section, and that is capable of being inserted into an opening portion formed at an attached-to member;
    an engagement portion that is formed at an outer peripheral portion of the attachment circular cylinder section, and that is capable of engaging with a peripheral edge portion of the opening portion by elastically deforming; and
    a retaining section that is formed at an inner peripheral portion of a boundary between the main body circular cylinder section and the attachment circular cylinder section, that is capable of retaining the line-shaped member, and that has a smaller internal diameter than an internal diameter of the main body circular cylinder section and an internal diameter of the attachment circular cylinder section;
    wherein at least one of an inner peripheral face of the main body circular cylinder section or an inner peripheral face of the attachment circular cylinder section has a cone shape with a decreasing diameter on progression toward the retaining section; and
    further comprising a plurality of protrusion portions that are formed projecting out from the retaining section at intervals therebetween in a peripheral direction of the retaining section, and that extend along the axial line direction.

2. The grommet of claim 1, wherein both the inner peripheral face of the main body circular cylinder section and the inner peripheral face of the attachment circular cylinder section have a cone shape with the decreasing diameter on progression toward the retaining section.

3. The grommet of claim 2, wherein a length of the main body circular cylinder section in the axial line direction is longer than a length of the attachment circular cylinder section in the axial line direction.

4. The grommet of claim 3, further comprising a contact portion that is formed at the outer peripheral portion of the attachment circular cylinder section, and that contacts an inner peripheral wall of the opening portion.

5. The grommet of claim 2, further comprising a contact portion that is formed at the outer peripheral portion of the attachment circular cylinder section, and that contacts an inner peripheral wall of the opening portion.

6. The grommet of claim 1, further comprising a contact portion that is formed at the outer peripheral portion of the attachment circular cylinder section, and that contacts an inner peripheral wall of the opening portion.

7. A grommet comprising:
    a main body circular cylinder section through which a line-shaped member is capable of being passed;
    an attachment circular cylinder section that is coupled to one end portion, in an axial line direction, of the main body circular cylinder section, and that is capable of being inserted into an opening portion formed at an attached-to member;
    an engagement portion that is formed at an outer peripheral portion of the attachment circular cylinder section, and that is capable of engaging with a peripheral edge portion of the opening portion by elastically deforming; and
    a retaining section that is formed at an inner peripheral portion of a boundary between the main body circular cylinder section and the attachment circular cylinder section, that is capable of retaining the line-shaped member, and that has a smaller internal diameter than an internal diameter of the main body circular cylinder section and an internal diameter of the attachment circular cylinder section;
    wherein at least one of an inner peripheral face of the main body circular cylinder section or an inner peripheral face of the attachment circular cylinder section has a cone shape with a decreasing diameter on progression toward the retaining section; and
    wherein a length of the main body circular cylinder section in the axial line direction is longer than a length of the attachment circular cylinder section in the axial line direction.

8. The grommet of claim 7, wherein at a position of the attachment circular cylinder section, the attachment circular cylinder section is engaged with the opening portion of the attached-to member by the engagement portion, the position being further toward a side of the main body circular cylinder section than a side of an opening end of the attachment circular cylinder section in an axial direction of the grommet.

9. A grommet comprising:
    a main body circular cylinder section through which a line-shaped member is capable of being passed;
    an attachment circular cylinder section that is coupled to one end portion, in an axial line direction, of the main body circular cylinder section, and that is capable of being inserted into an opening portion formed at an attached-to member;
    an engagement portion that is formed at an outer peripheral portion of the attachment circular cylinder section, and that is capable of engaging with a peripheral edge portion of the opening portion by elastically deforming; and
    a retaining section that is formed at an inner peripheral portion of a boundary between the main body circular cylinder section and the attachment circular cylinder section, that is capable of retaining the line-shaped member, and that has a smaller internal diameter than an internal diameter of the main body circular cylinder section and an internal diameter of the attachment circular cylinder section;
    wherein at least one of an inner peripheral face of the main body circular cylinder section or an inner peripheral face of the attachment circular cylinder section has a cone shape with a decreasing diameter on progression toward the retaining section; and
    at a position of the attachment circular cylinder section, the attachment circular cylinder section is engaged with the opening portion of the attached-to member by the engagement portion, the position being further toward a side of the main body circular cylinder section than a side of an opening end of the attachment circular cylinder section in an axial direction of the grommet.

10. A grommet comprising:

a main body circular cylinder section through which a line-shaped member is capable of being passed;

an attachment circular cylinder section that is coupled to one end portion, in an axial line direction, of the main body circular cylinder section, and that is capable of being inserted into an opening portion formed at an attached-to member;

an engagement portion that is formed at an outer peripheral portion of the attachment circular cylinder section, and that is capable of engaging with a peripheral edge portion of the opening portion by elastically deforming; and a retaining section that is formed at an inner peripheral portion of a boundary between the main body circular cylinder section and the attachment circular cylinder section, that is capable of retaining the line-shaped member, and that has a smaller internal diameter than an internal diameter of the main body circular cylinder section and an internal diameter of the attachment circular cylinder section;

wherein at least one of an inner peripheral face of the main body circular cylinder section or an inner peripheral face of the attachment circular cylinder section has a cone shape with a decreasing diameter on progression toward the retaining section; and the grommet is attached to the attached-to member by:

the engagement portion, and a flange portion which is formed at an outer peripheral portion of a coupling portion which is between the main body circular cylinder section and the attachment circular cylinder section.

* * * * *